(12) United States Patent
He et al.

(10) Patent No.: US 11,815,891 B2
(45) Date of Patent: Nov. 14, 2023

(54) END DYNAMICS AND CONSTRAINTS RELAXATION ALGORITHM ON OPTIMIZING AN OPEN SPACE TRAJECTORY

(71) Applicant: Baidu USA LLC, Sunnyvale, CA (US)

(72) Inventors: Runxin He, Sunnyvale, CA (US); Yu Wang, Sunnyvale, CA (US); Jinyun Zhou, Sunnyvale, CA (US); Qi Luo, Sunnyvale, CA (US); Jinghao Miao, Sunnyvale, CA (US); Jiangtao Hu, Sunnyvale, CA (US); Jingao Wang, Sunnyvale, CA (US); Jiaxuan Xu, Sunnyvale, CA (US); Shu Jiang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 243 days.

(21) Appl. No.: 16/659,963

(22) Filed: Oct. 22, 2019

(65) Prior Publication Data

US 2021/0116916 A1    Apr. 22, 2021

(51) Int. Cl.
*G05D 1/00* (2006.01)
*G05D 1/02* (2020.01)

(52) U.S. Cl.
CPC ......... *G05D 1/0088* (2013.01); *G05D 1/0214* (2013.01); *G05D 1/0221* (2013.01); *G05D 2201/0213* (2013.01)

(58) Field of Classification Search
CPC .. G05D 1/0088; G05D 1/0214; G05D 1/0221; G05D 2201/0213
See application file for complete search history.

(56) References Cited

U.S. PATENT DOCUMENTS

| 10,118,610 B2 * | 11/2018 | Deng ................ B60W 50/0097 |
| 10,535,256 B1 * | 1/2020 | Lim ................. G08G 1/096811 |
| 10,754,339 B2 * | 8/2020 | Zhu ........................ G08G 1/01 |
| 2005/0080558 A1 * | 4/2005 | Kasai ................ G01C 21/3415 |
| | | 701/423 |
| 2017/0015312 A1 * | 1/2017 | Latotzki ............... B62D 15/027 |

(Continued)

FOREIGN PATENT DOCUMENTS

CN       106864361 A   *   6/2017   ............... B60Q 5/00

*Primary Examiner* — Dale W Hilgendorf
*Assistant Examiner* — Frank T Glenn, III
(74) *Attorney, Agent, or Firm* — WOMBLE BOND DICKINSON (US) LLP

(57) ABSTRACT

A method of navigating an autonomous driving vehicle (ADV) includes determining a target function for an open space model based on one or more obstacles and map information within a proximity of the ADV, then iteratively performing first and second quadratic programming (QP) optimizations on the target function. Then, generating a second trajectory based on results of the first and second QP optimizations to control the ADV autonomously using the second trajectory. The first QP optimization is based on fixing a first set of variables of the target function. The second QP optimization is based on maximizing a sum of the distances from the ADV to each of the obstacles over a plurality of points of the first trajectory, and minimizing a difference between a target end-state of the ADV and a determined final state of the ADV using the first trajectory.

21 Claims, 8 Drawing Sheets

(56) References Cited

U.S. PATENT DOCUMENTS

| | | | |
|---|---|---|---|
| 2018/0362025 A1* | 12/2018 | Oppolzer | B62D 15/0285 |
| 2019/0146498 A1* | 5/2019 | Balachandran | G06Q 10/047 |
| | | | 701/23 |
| 2019/0220016 A1* | 7/2019 | Phillips | G01C 21/20 |
| 2019/0235516 A1* | 8/2019 | Zhang | B60W 30/00 |
| 2020/0142405 A1* | 5/2020 | Havens | G05D 1/0212 |

* cited by examiner

END DYNAMICS AND CONSTRAINTS RELAXATION ALGORITHM ON OPTIMIZING AN OPEN SPACE TRAJECTORY

TECHNICAL FIELD

Embodiments of the present disclosure relate generally to operating autonomous vehicles. More particularly, embodiments of the disclosure relate to improving control of an autonomous driving vehicle (ADV) in open space trajectory environments.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

Trajectories are usually planned based on traffic lanes/reference lines which are pre-labeled within a high-definition (HD) map. This process limits the applicable scenarios for autonomous vehicles with full autonomous driving, such as, in open space scenarios, where the model has to plan trajectories (e.g., parking, U-turn, or three point turns) without a reference lane, and at the same time, to avoid a collision.

There are several drawbacks to prior art solutions to open space optimization problems. First the end dynamic states are physically fixed based on a desired stop position. The over-strict end state constraint may lead to failure to solve the optimization problem in real time. Second, the collision-avoidance constraint is without any fault-tolerance. In other words, the collision avoidance constraint is without any buffer-zone or safety-distance to avoid actual collision, which may result in a collision due to control errors, under practical application. Further, in some cases, if the optimization problem converges to a solution at all, the solution is not obtained fast enough for practical and safe operation of the autonomous vehicle in real-time.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
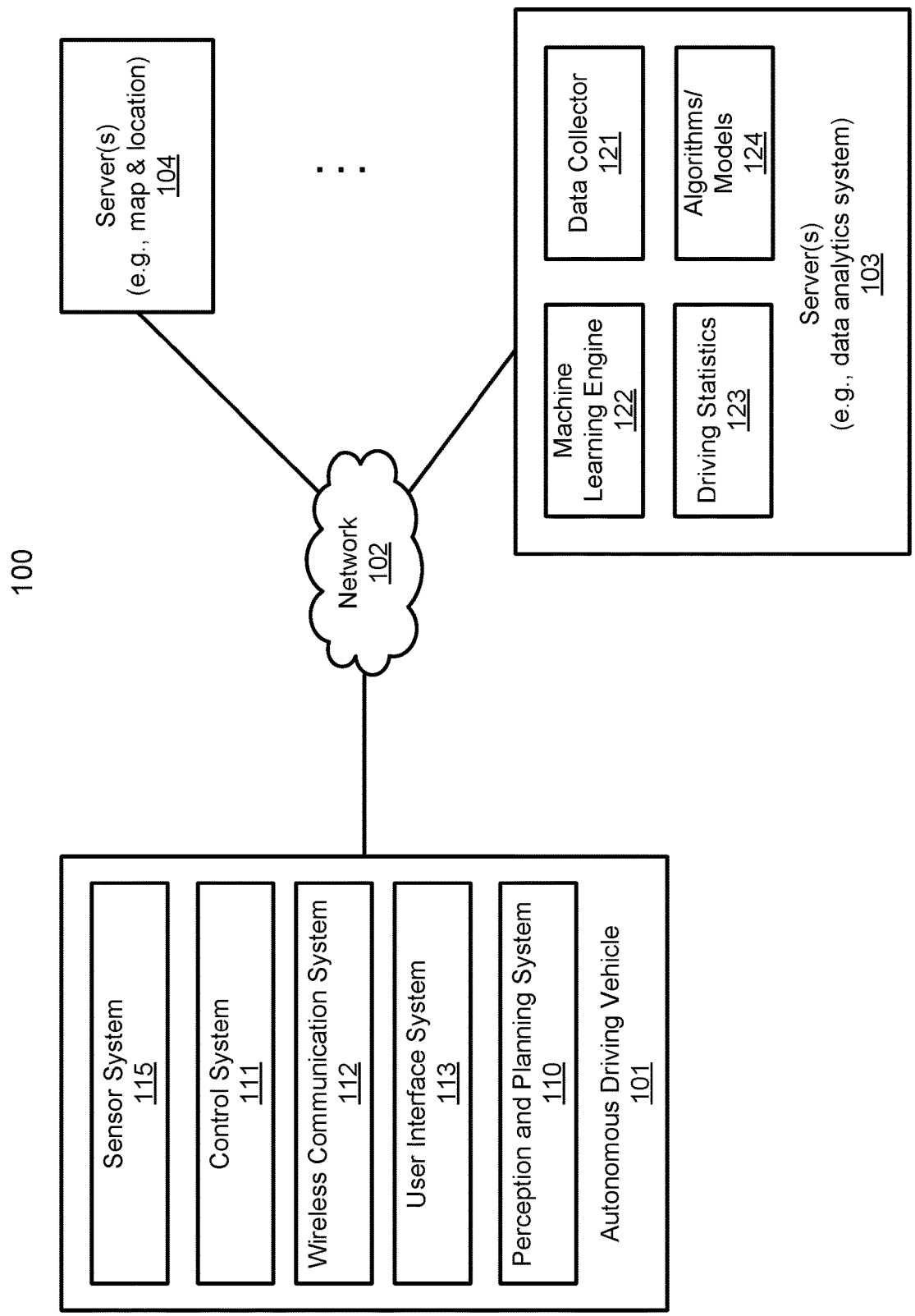
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

To overcome the problems of the prior art, described above, optimizing an open space trajectory problem, with one or more obstacles surrounding the autonomous driving vehicle (ADV) includes a constraints relaxation strategy for the optimization problem that eliminates hard constraints of the (1) fixed end state assignments at the stop step of the trajectory, and (2) the hard collision-avoidance construction at every step, and, instead, adds flexible optimization of (1) the end states deviation penalty and (2) collision-avoidance buffer-zone award in the open space trajectory target function.

In a first aspect, a computer-implemented method for operating an autonomous driving vehicle, includes determining a target function for an open space model based on one or more obstacles and map information within a proximity of an autonomous driving vehicle (ADV). The method further includes, iteratively, until a predetermined converged condition is satisfied, performing a first quadratic programming (QP) optimization on the target function based on a first trajectory while fixing a first set of variables of the target function, and performing a second QP optimization on the target function based on a result of the first QP optimization while fixing a second set of variables of the target function. The first set of variables can be dual variables that are used to calculate a distance between each of the one or more obstacles and the ADV. The second set of variables can include variables for control of the ADV and trajectory of the ADV.

The second QP optimization on the target function can include maximizing a sum of the distances from the ADV to a boundary of each obstacle in a set of one or more obstacles over each of a plurality of points of the first trajectory. The second optimization on the target function can also include minimizing a difference between a target end-state of the ADV of the first trajectory and a determined final state of the ADV of the first trajectory. The method further includes generating a second trajectory based on results of the first and the second QP optimizations to control the ADV autonomously according to the second trajectory. In an embodiment, the method also includes applying a hybrid A-star (A*) search algorithm to the open space model to generate the first trajectory. The target function can include a quadratic cost function for the first QP optimization and the second QP optimization. The open space model can generate a trajectory for the ADV without following a reference line or traffic lines. The open space model can also include a vehicle dynamic model for the ADV.

In an embodiment, any/all of the above method functionality can be implemented by a processing system, comprising one or more hardware processors coupled to a memory programmed with executable instructions that, when executed by the processing system, cause a computing system to implement the claimed functionality. In an embodiment, the memory can be a non-transitory computer-readable medium or other type of memory.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to operate in an autonomous mode in which the vehicle navigates through an environment with little or no input from a driver. The environment can include an "open space" environment that may not have lane markings or curb markings, and may be difficult to navigate. Examples include performing a U-turn, performing a three-point turn, pulling to the side of the road, or parking a car in a parking lot. Such an open space environment may typically be navigated at slow speed, such as less than 10 miles per hour (mph). There may also be many obstacles, both moving and stationary, which the autonomous vehicle may need to navigate around. Such navigation can include one or more sharp turns, changes from forward to reverse gears, and back, in an attempt to navigate the autonomous vehicle in the open space environment. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
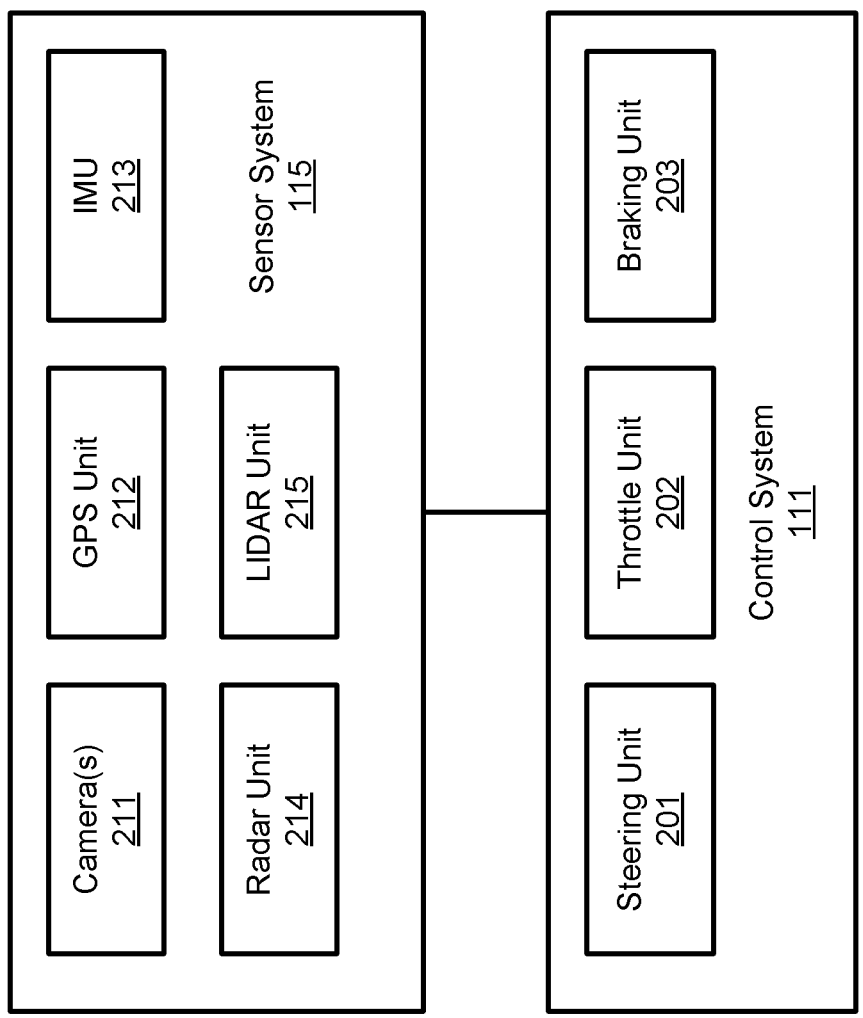
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. In an open space environment, the autonomous vehicle may be commanded by a user to perform a specified function such as: locate a parking space (destination) and navigate to the parking space from the current (starting) location of the autonomous vehicle. Similarly, in an open space environment, the user may command the autonomous vehicle to perform a U-turn, or three-point turn, from the current (starting) location. The user may enter an additional destination that the autonomous vehicle is to treat as the next destination after the U-turn or three-point turn has been performed. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc. Driving statistics may be collected for open space driving scenarios for the purpose of optimizing certain constants within an open space trajectory target function.

Based on driving statistics 123, machine learning engine 122 generates or trains a set of rules, algorithms, and/or predictive models 124 for a variety of purposes. In one embodiment, algorithms/models 124 may include a bicycle model to model the vehicle dynamics for the ADV, an open space optimization model or an RL agent/environment model to plan a trajectory for the ADV in an open space. Algorithms/models 124 can then be uploaded on ADVs (e.g., models 313 of FIG. 3A) to be utilized by the ADVs in real-time.

Figure 3A:
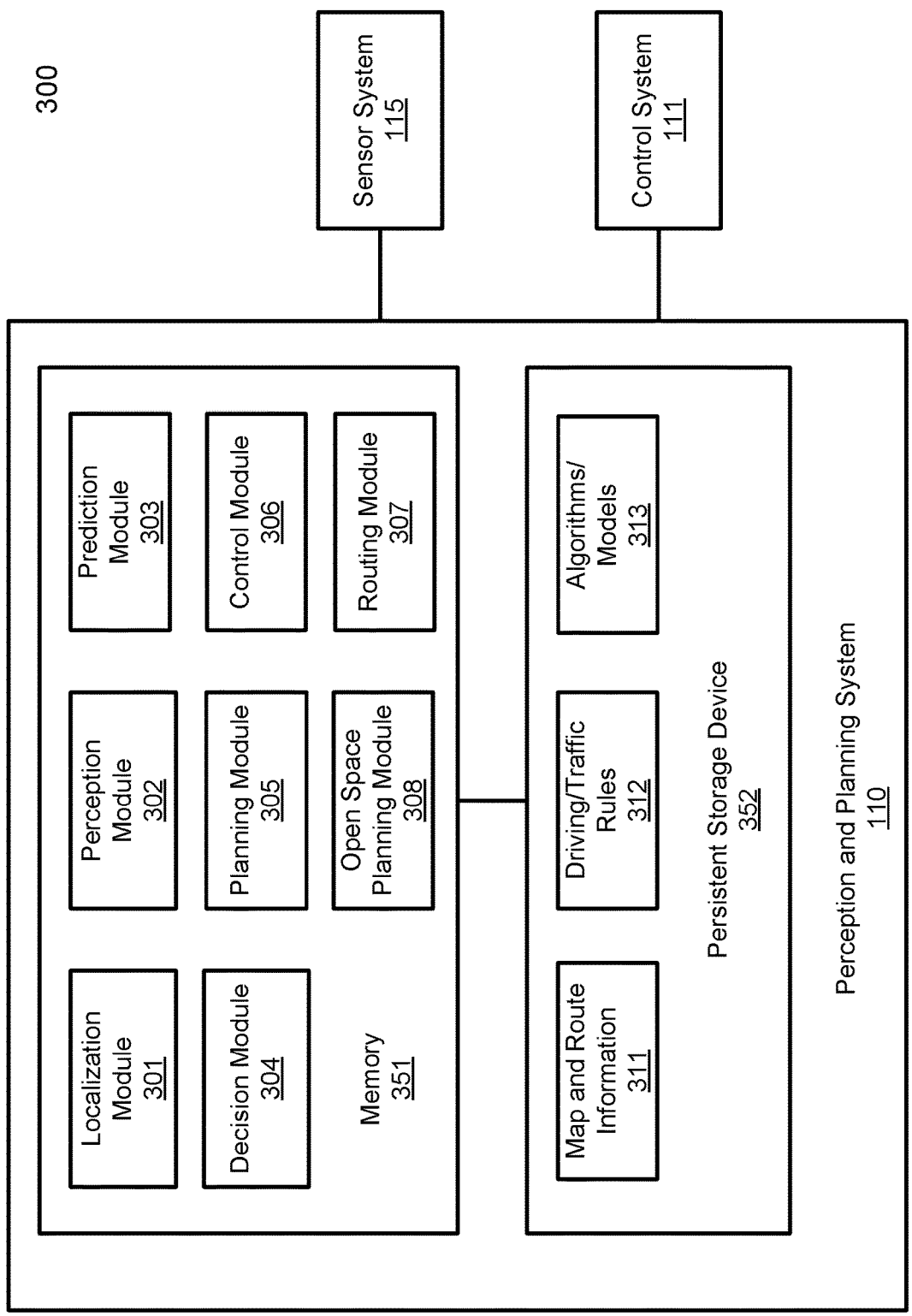
FIGS. 3A-3B are block diagrams illustrating an example of a perception and planning system used with an autonomous vehicle according to one embodiment.
Figure 3B:
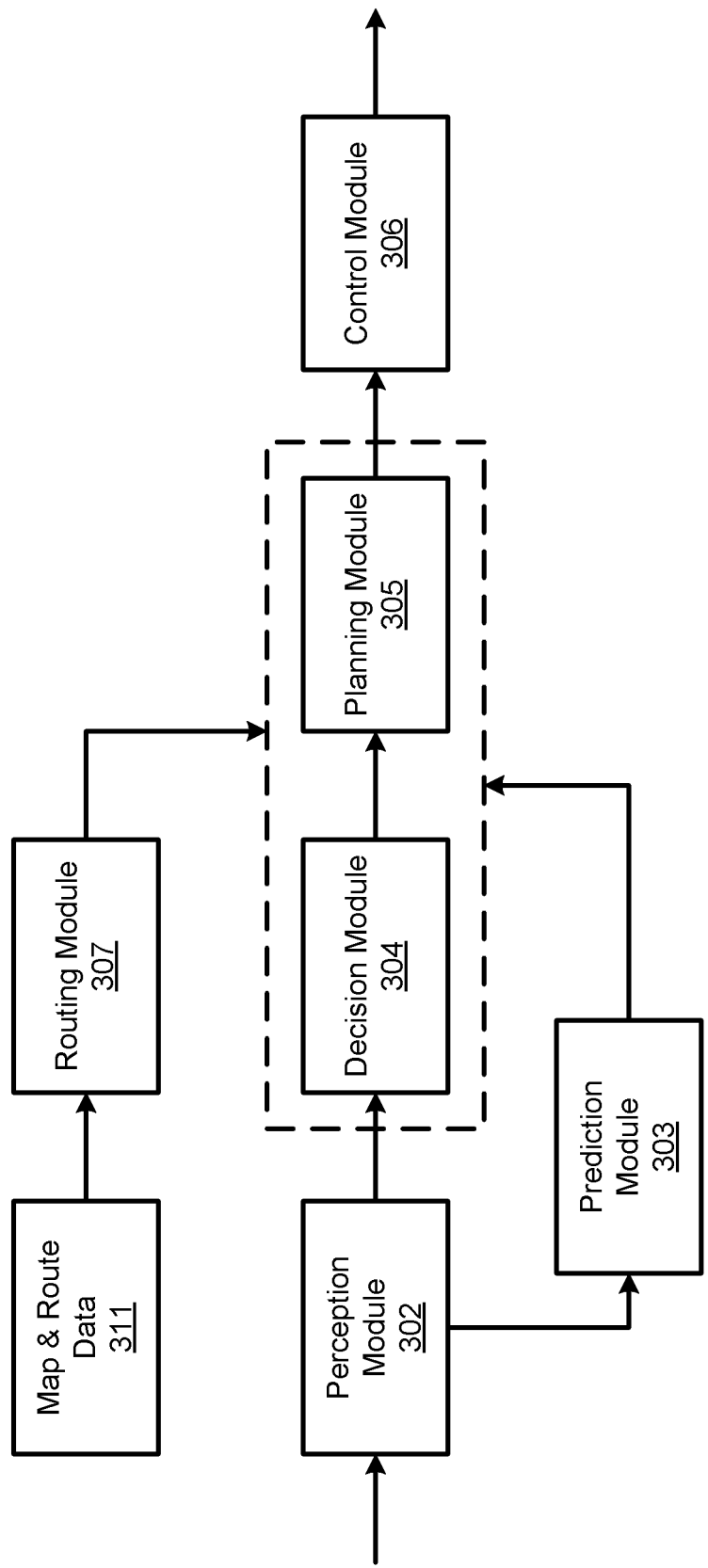

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and open space planning module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, planning module 305 and open space planning module 308 may be an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Open space planning module 308 is described below with reference to FIG. 4. Another aspect of the open space planning module 308 is described below with reference to FIG. 7. Open space planning module 308 may be implemented as a part of planning module 305.

Figure 4:
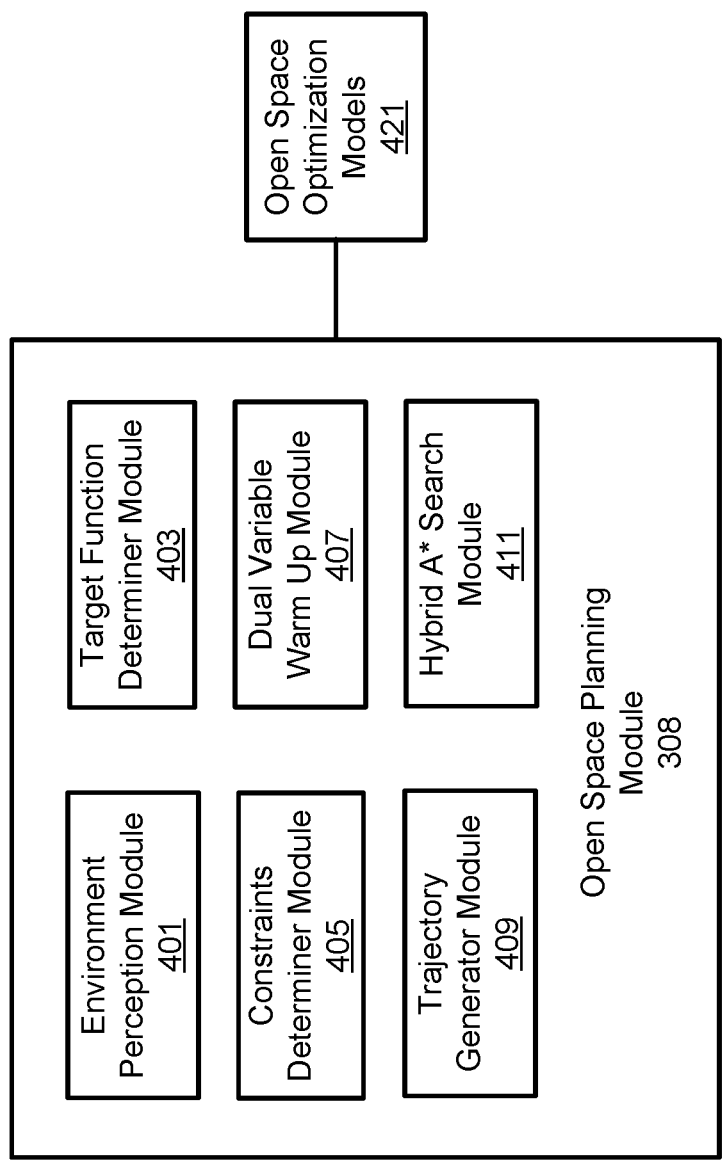
FIG. 4 is a block diagram illustrating an example of an open space planning module according to one embodiment.

FIG. 4 is a block diagram illustrating an example of an open space planning module according to one embodiment. Open space planning module 308 can generate a trajectory for an ADV in an open space, where there is no reference lines or traffic lanes to be followed. Examples of an open space include a parking lot, or a roadway where a vehicle performs a parallel parking, a U-turn, or a three-point turn. Referring to FIG. 4, in one embodiment, open space planning module 308 includes environment perception module 401, target function determiner module 403, constraints determiner module 405, dual variable warming up module 407, trajectory generator module 409, and hybrid A* search module 411. Environment perception module 401 can perceives an environment of the ADV. Target function determiner module 403 can determine a target function for an optimization model (e.g., open space optimization model 421 (as part of models 313 of FIG. 3A)) to optimize. Constraints determiner module 405 can determine constraints for the optimization model. Constraints can include inequality, equality, and bound constraints. Dual variable warming up module 407 can apply a quadratic programming (QP) solver to a target (objective) function to solve for one or more variables (such as dual/two variables) subject to some constraints, where the target function is a quadratic function. Trajectory generator module 409 can generate a trajectory based on the solved variables. Hybrid A* search module 411 can search for an initial trajectory (zig zag, non-smooth trajectory without consideration for observed obstacles) using a search algorithm, such as an A* search algorithm, or a hybrid A* search algorithm.

Figure 5:
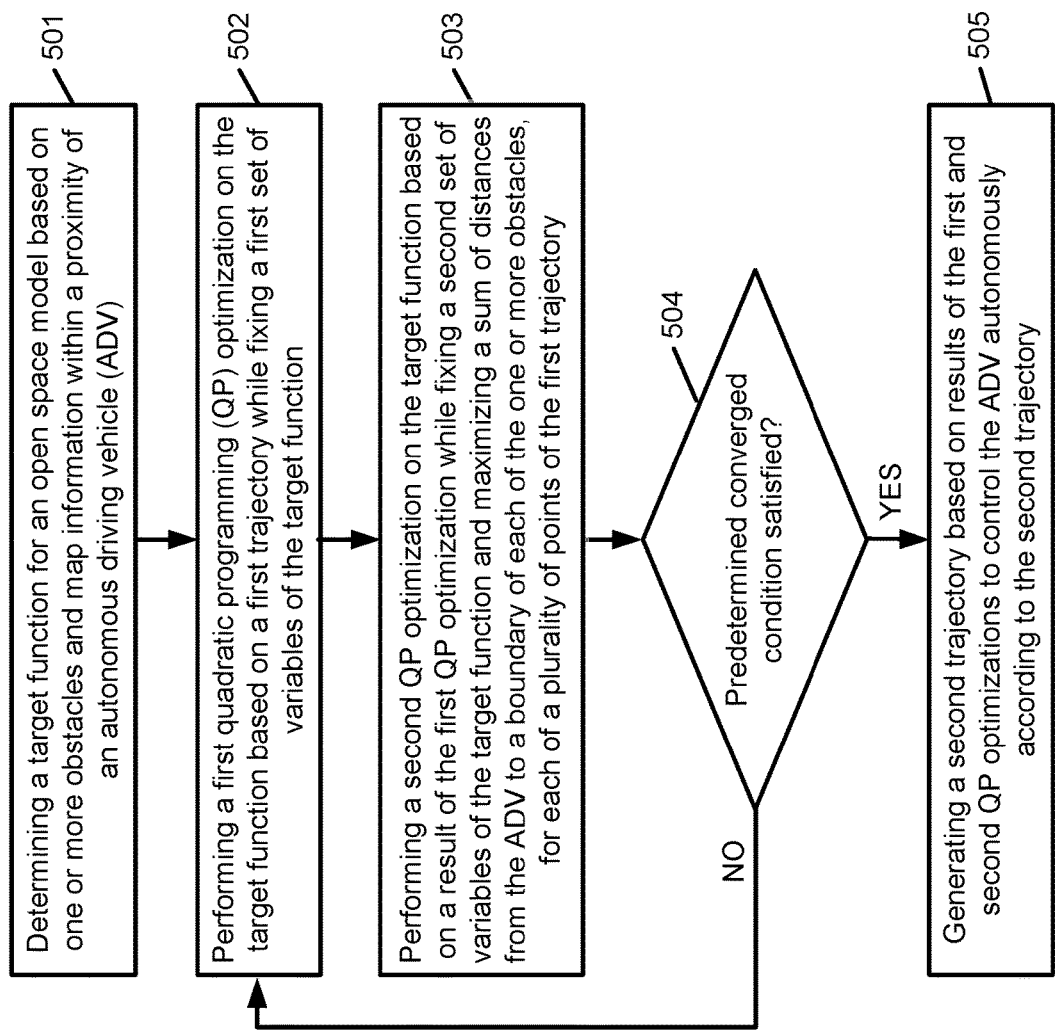
FIG. 5 is a flowchart illustrating an example of a work flow for the open space planning module according to one embodiment.

FIG. 5 is a flowchart illustrating an example of a work flow for the open space planning module for an ADV according to one embodiment. Referring FIG. 5, in operation 501, processing logic extracts environment constraints from HD map, and moving obstacles constraints from prediction module, e.g. prediction module 303, to generate the open space optimization algorithm, and initializes matrices/vectors for the constraints of the optimization algorithm. In one embodiment, the optimization model can be previously generated and uploaded on the ADV (e.g., model 421 of FIG. 4, as part of models 313 of FIG. 3A). Constraints can include distances from the vehicle to the open road boundaries, dimensions of accessible roadways, road curbs, and one or more obstacles. The obstacles can include moving obstacles such as cars and moving pedestrians, and non-moving obstacles such as buildings, blockades, and fences. The moving obstacles can be processed by the prediction module to determine the predicted locations for the moving obstacles at some later point in time. These obstacles and constraints can be modeled into matrices and vectors for an optimization algorithm.

An example of an optimization algorithm for a controlled object and obstacles can be given as:

$$\mathcal{J}(x, u, d) = \sum_{k=0}^{K} l(x(k), u(k)) + \alpha \|x(k) - x_F\|_2^2 + \beta \sum_{m=0}^{M} \sum_{k=0}^{K} d_m(k)$$

wherein:
(1) $\mathcal{J}$ is a cost function based upon the autonomous driving vehicle (ADV) state variable x, ADV control variable u, and a collection d of distances from the ADV to each object in a collection of M obstacles,
(2) $\Sigma_{k=0}^{K} l(x(k), u(k))$ is a cost function that is used to smooth trajectory and save control energy.
(3) x(k) is a trajectory for a discretized time step k,
(4) u(k) is represents control inputs to the ADV at time step k,
(5) $\alpha > 0$ represents a hyper-parameter to minimize the final state's position to the target $x_F$,
(6) $\alpha \|x(k) - x_F\|_2^2$ is a penalty for the deviation between the $k^{th}$ location and heading of the ADV at time k, x(k), and the final location and heading, $x_F$, of the ADV, tuned by constant, $\alpha$,
(7) $\beta > 0$ is a hyper-parameter to maximize the total safety distances between the ADV and the M obstacles and other boundaries, and
(8)

$$\beta \sum_{m=0}^{M} \sum_{k=0}^{K} d_m(k)$$

is a collision-avoidance buffer-zone aware $d_m(k)$, added to the original target function.

The above open space target function for the trajectory of the ADV is subject to:
(1) $x(0) = x_0$, wherein $x_0$ is an initial state of the ADV at time increment k=0,
(2) $x(k+1) = f(x(k), u(k))$, wherein f is a vehicle dynamic model, such as a bicycle model of a vehicle,
(3) $h(x(k), u(k)) \leq 0$, wherein h is a function that includes limitations of the ADV, such as maximum heading ratio, velocity, and acceleration of the vehicle.
(4) $-g^T \mu_m(k) + (A_m t(x(k)) - b_m)^T \lambda_m(k) + d_m(k) > 0$, wherein matrix A and vector b relates to sizes and locations of one or more obstacles surrounding the vehicle,
(5) $G^T \mu_m(k) + R(x(k))^T A_m^T \lambda_m(k) = 0$, wherein $g^T$ and $G^T$ relate to a size and location of the ADV, respectively. $\lambda$ and $\mu$ describe dual variables representing distances between obstacles and the vehicle, and R is a rotation matrix, measuring a rotation of the ADV relative to the M obstacles, based on a reference direction of the ADV. Some variables may not be initialized without an initial trajectory, e.g., R is not defined without an initial trajectory. Matrix A and vector b relate to sizes and locations of one or more obstacles surrounding the ADV. The obstacles can be modeled as, e.g., polygons.
(6) $\|A_m^T \lambda_m(k)\|_2 \leq 1$, wherein matrix $A_m$ represents the $m^{th}$ polygon of a set of obstacles,
(7) $\lambda_m(k) \geq 0$, $\mu_m(k) \geq 0$, wherein $\lambda_m(k)$ and $\mu_m(k)$ are dual variables representing distances between the $m^{th}$ polygon of a set of obstacles and the ADV at time step k of the trajectory,
(8) $d_m(k) \leq 0$, describes the safety distance between the vehicle and the $m^{th}$ obstacle polygon at time step k, for k=0, K, m=1, . . . , M, and d is the notation of their collection.

In operation 502, open space planning module 308 can perform a first quadratic programming (QP) optimization on the target function on a first trajectory, while fixing a first set of variables of the target function. In an embodiment, the first set of variables can include the dual variables, $\lambda$ and $\mu$, representing distances between polygons of sets of obstacles and the ADV over time increments k=0 . . . K. In an embodiment, the first trajectory can be obtained by a Hybrid A* search.

In operation 503, open space planning module 308 can perform a second QP optimization on the target function while fixing a second set of variables and maximizing a sum of distances away from the ADV to a boundary of each of the one or more obstacles over each of a plurality of points of the first trajectory. The distance of the ADV away from any polygon m of a set of obstacles at time step k can be expressed as a negative number, such that the optimization seeks to maximize the distance (i.e., the magnitude of the negative distances) of the ADV away from each polygon m of a set of obstacles for all time steps k=0 . . . K of the first trajectory by optimizing the sum:

$$\beta \sum_{m=0}^{M} \sum_{k=0}^{K} d_m(k)$$

In operation 504, it can be determined whether the optimization of the open space model target function converges to a predetermined condition. If so, then method 500 continues at operation 505, otherwise method 500 continues at operation 502.

In operation 505, open space planning module 308 can generate a second trajectory based on the results of the first and second QP optimizations. The ADV can then be controlled autonomously according to the second trajectory.

Figure 6:
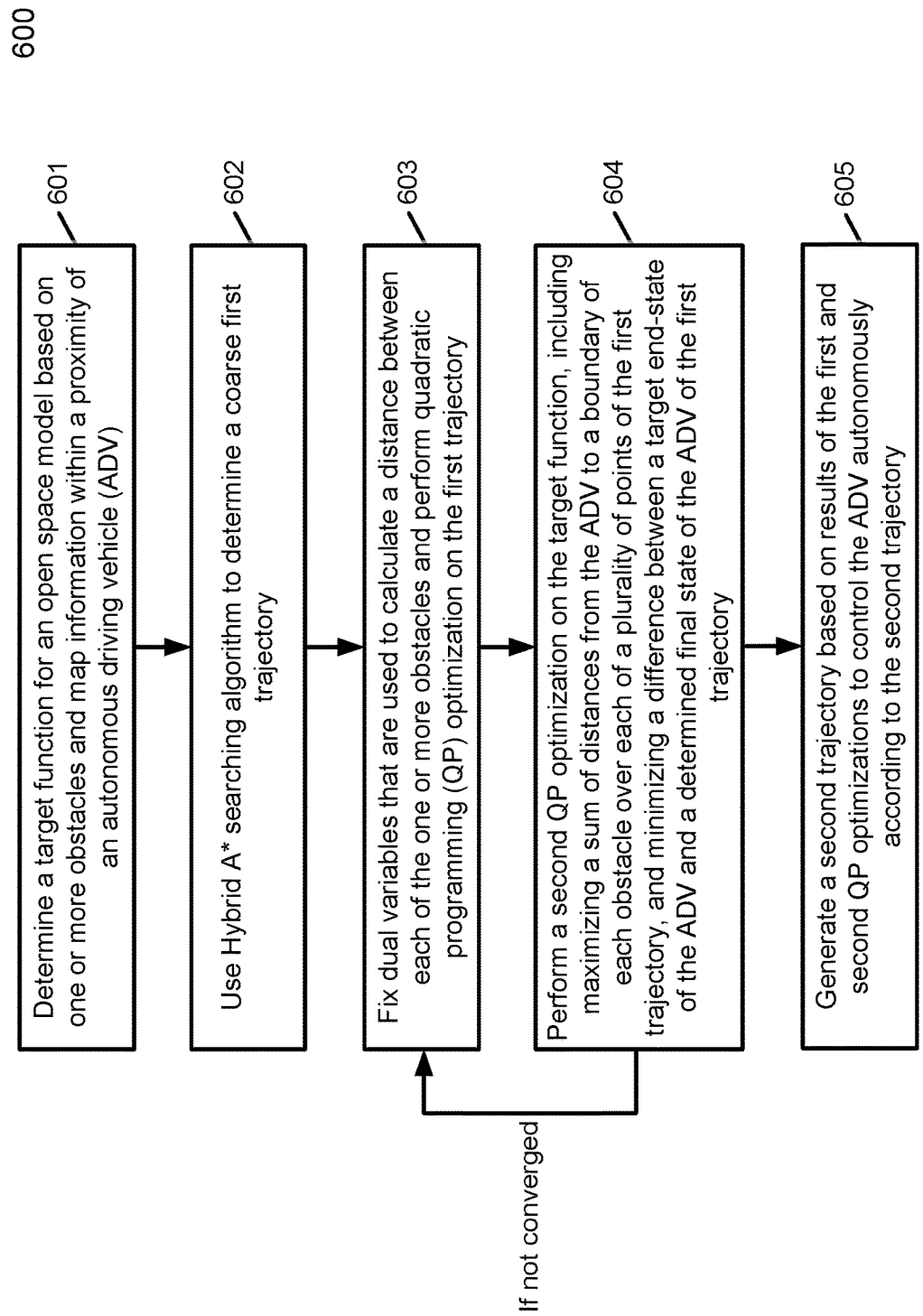
FIG. 6 is a flow diagram illustrating an example method according to one embodiment.

FIG. 6 is a flow diagram illustrating an example method according to one embodiment. Process 600 may be performed by processing logic which may include software, hardware, or a combination thereof. For example, process 600 may be performed by open space planning module 308 of FIG. 4.

In operation 601 of FIG. 6, open space planning module, e.g. 308, can determine a target function for an open space model based on one or more obstacles and map information within a proximity of the ADV. Obstacle locations can be determined by perception module 302 and prediction module 303. Map data can be obtained from localization module 301 and map and route information module 311. The target function can be, e.g., the target function $\mathcal{J}(x, u, d)$ as described above with reference to FIG. 5.

In operation 602, processing logic, such as Hybrid A* searching module 411, can use a Hybrid A* searching algorithm to determine a coarse first trajectory between a starting point and stop point or ending point of the trajectory of the ADV.

In operation 603, open space planning module 308 can perform a first quadratic programming (QP) optimization on the target function on a first trajectory (determined in operation 602 above), while fixing a first set of variables of the target function. In an embodiment, the first set of variables can include the dual variables, λ and μ, representing distances between polygons of sets of obstacles and the ADV over time increments k=0 . . . K.

In operation 604, open space planning module 308 can perform a second QP optimization on the target function while fixing a second set of variables and maximizing a sum of distances away from the ADV to a boundary of each of the one or more obstacles over each of a plurality of points of the first trajectory. The distance of the ADV away from any polygon m of a set of obstacles at time step k can be expressed as a negative number, such that the optimization seeks to maximize the distance of the ADV away from each polygon m of a set of obstacles for all time steps k=0 . . . K of the first trajectory by optimizing the sum:

$$\beta \sum_{m=0}^{M} \sum_{k=0}^{K} d_m(k)$$

wherein β is a tuning constant. In one embodiment, β is configurable. In one embodiment, the second set of variables includes variables x and u, for control of the ADV and trajectory of the ADV. Operation 604 further includes minimizing a difference between a target end-state, $x_F$, of the ADV and a determined final state of the ADV of the first trajectory, x(k). In an embodiment, the minimizing the difference comprises minimizing the term: $\alpha \|x(k)-x_F\|_2^2$ of the target function for the open space model based on one or more obstacles and map information within a proximity of the ADV, wherein α is a tuning constant. In an embodiment, α is configurable. In the open space model target function optimization does not converge to a predetermined condition, then method 600 continues at operation 603, otherwise method 600 continues at operation 605.

In operation 605, open space planning module 308 can generate a second trajectory based on the results of the first and second QP optimizations. The ADV can then be controlled autonomously according to the second trajectory.

In one embodiment, the target function includes a quadratic cost function for the first and the second QP optimizations. In one embodiment, the open space model is to generate a trajectory for the ADV without following a reference line or traffic lines. In one embodiment, the open space model includes a vehicle dynamic model for the ADV.

Figure 7:
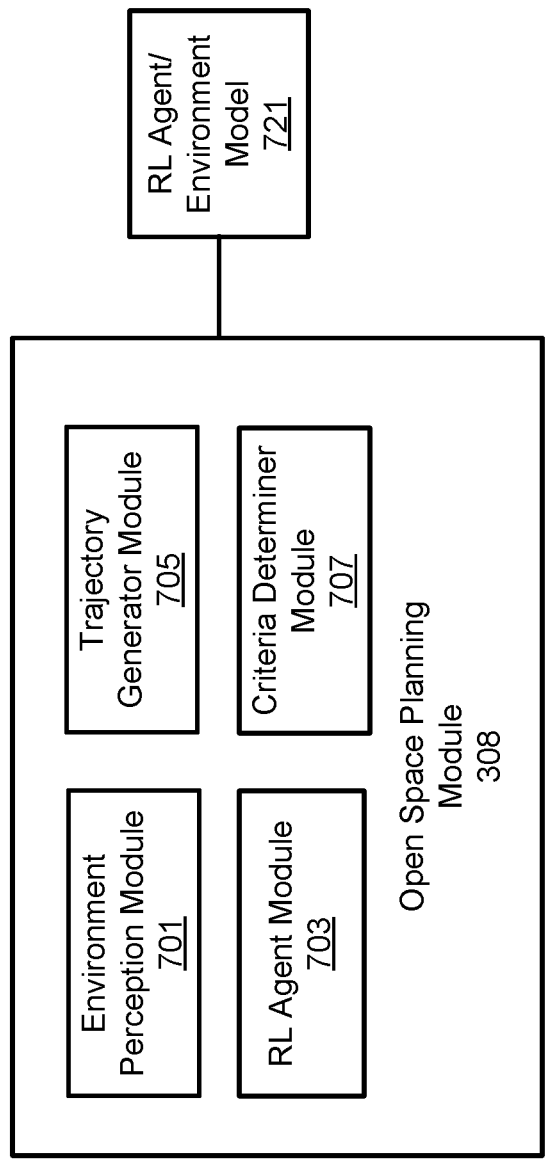
FIG. 7 is a block diagram illustrating an example of an open space planning module according to another embodiment.

FIG. 7 is a block diagram illustrating an example of an open space planning module according to another embodiment. Open space planning module 308 can generate a trajectory using a RL agent for an ADV in an open space, where there is no reference lines or traffic lanes to be followed. Referring to FIG. 7, in one embodiment, open space planning module 308 includes environment perception module 701, RL agent module 703, trajectory generator module 705, and criteria determiner module 707. Environment perception module 701 can perceive an environment of the ADV. The environment perceived includes information for locations and sizes of perceived obstacles. The environment can further include map and geographical information, shapes and sizes of parking lot and/or road for the ADV. The perceived information can further include information about the ADV, such as position, speed and a targeted parking spot for the ADV. RL agent module 703 can apply a RL agent (e.g., RL agent/environment model 721, as part of model 313 of FIG. 3A) to an observed environment of the ADV, e.g., an initial trajectory state of the ADV. The RL agent 721 can include an actor-critic framework, where the actor includes a policy decision to determine a control or action for the ADV for a given state, and the critic includes a measurement scheme to determine a value or reward prediction for the action based on the given state. The environment model can model a perceived environment of the ADV, vehicle dynamics, vehicle control limits, and a reward grading or scoring metric, such that the environment model can generate an actual reward and a next trajectory state based on an action and a current trajectory state for the ADV. Thus, the RL agent and the environment model can iteratively generate a number of next trajectory states (e.g., an output trajectory) and a number of controls/actions. The scoring metric can include a scoring scheme to evaluate whether the RL agent planned a trajectory with a final trajectory state at the destination spot, whether the trajectory is smooth, whether the trajectory avoids all the perceived obstacles.

Referring to the actor-critic framework, in one embodiment, the actor includes a first neural network, and the critic includes a second neural network. In another embodiment, critic includes a scoring equation/formula. The first and second neural networks can be deep neural networks. Trajectory generator module 705 can generate a trajectory for the ADV based on a current trajectory state of the ADV to control the ADV to a destination state. Criteria determiner module 707 can contain a judgment logic to compare an output trajectory of an RL agent (as part of RL agents 721). The comparison can be based on a reference trajectory which can be an output trajectory from an optimization model (as part of optimization models 421 of FIG. 4). The judgment logic can determine if the comparison results in a difference below a threshold.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle, the method comprising:
   determining a target function for an open space model based on two or more obstacles and map information within a proximity of an autonomous driving vehicle (ADV);
   iteratively, until a predetermined converged condition is satisfied,
      determining a first trajectory that initializes a first set of variables including dual variables that indicate a distance between each of the two or more obstacles and the ADV,
      performing a first quadratic programming (QP) optimization on the target function based on the first trajectory while fixing the first set of variables of the target function, and
      performing a second QP optimization on the target function based on a result of the first QP optimization while fixing a second set of variables of the target function, wherein second QP optimization includes maximizing a sum of distances from the ADV to a boundary of each obstacle in a set of two or more obstacles, over each of a plurality of points in time of the first trajectory, and wherein the target function includes a penalty for deviation based on the second QP optimization on the target function;
   generating a second trajectory based on results of the first and the second QP optimizations; and
   controlling the ADV autonomously according to the second trajectory.

2. The method of claim 1, further comprising applying a hybrid A-star (A*) search algorithm to the open space model to generate the first trajectory.

3. The method of claim 1, wherein the first set of variables includes dual variables representing distances between polygon sets of obstacles and the ADV, over the plurality of points in time, the plurality of points in time including points $k=0 \ldots K$, and the dual variables are used to calculate a distance between each of the two or more obstacles and the ADV for the second QP optimization.

4. The method of claim 1, wherein the second QP optimization on the target function further includes minimizing a sum of a difference at each of the plurality of points, the plurality of points in time including points $k=0 \ldots k$, between a location and heading, $x(k)$, of the ADV at time k, and a determined final location and heading, XF, of the ADV at the end of the first trajectory.

5. The method of claim 1, wherein the target function includes a quadratic cost function for the first QP optimization and the second QP optimization.

6. The method of claim 1, wherein the open space model is to generate a trajectory for the ADV without following a reference line or traffic lines, and wherein the obstacles are modeled as polygons.

7. The method of claim 1, wherein the open space model includes a vehicle dynamic model for the ADV.

8. A non-transitory machine-readable medium having instructions stored therein, which when executed by a processor, cause the processor to perform operations, the operations comprising:

determining a target function for an open space model based on two or more obstacles and map information within a proximity of an autonomous driving vehicle (ADV);

iteratively, until a predetermined converged condition is satisfied, determining a first trajectory that initializes a first set of variables including dual variables that indicate a distance between each of the two or more obstacles and the ADV, performing a first quadratic programming (QP) optimization on the target function based on the first trajectory while fixing the first set of variables of the target function, and performing a second QP optimization on the target function based on a result of the first QP optimization while fixing a second set of variables of the target function, wherein second QP optimization includes maximizing a sum of distances from the ADV to a boundary of each obstacle in a set of two or more obstacles over each of a plurality of points in time of the first trajectory, and wherein the target function includes a penalty for deviation based on the second QP optimization on the target function;

generating a second trajectory based on results of the first and the second QP optimizations; and controlling the ADV autonomously according to the second trajectory.

9. The non-transitory machine-readable medium of claim 8, wherein the operations further comprise applying a hybrid A-star (A*) search algorithm to the open space model to generate the first trajectory.

10. The non-transitory machine-readable medium of claim 8, wherein the first set of variables includes dual variables that represent distances between polygon sets of obstacles and the ADV, over the plurality of points, the plurality of points in time including points k=0 . . . K, and the dual variables are used to calculate a distance between each of the obstacles and the ADV for the second QP optimization.

11. The non-transitory machine-readable medium of claim 8, wherein the second QP optimization further includes minimizing a sum of a difference at each point in the plurality of points, the plurality of points in time including points 5=0 . . . K, between a location and heading, x(k), of the ADV at time k, and a determined final location and heading, XF, of the ADV at the end of the first trajectory.

12. The non-transitory machine-readable medium of claim 8, wherein the target function includes a quadratic cost function for the first and the second QP optimizations.

13. The non-transitory machine-readable medium of claim 8, wherein the open space model is to generate a trajectory for the ADV without following a reference line or traffic lines, and wherein the obstacles are modeled as polygons.

14. The non-transitory machine-readable medium of claim 8, wherein the open space model includes a vehicle dynamic model for the ADV.

15. A data processing system, comprising:

a processor; and a memory coupled to the processor to store instructions, which when executed by the processor, cause the processor to perform operations, the operations including determining a target function for an open space model based on two or more obstacles and map information within a proximity of an autonomous driving vehicle (ADV), iteratively, until a predetermined converged condition is satisfied, determining a first trajectory that initializes a first set of variables including dual variables that indicate a distance between each of the two or more obstacles and the ADV, performing a first quadratic programming (QP) optimization on the target function based on the first trajectory while fixing the first set of variables of the target function, and performing a second QP optimization on the target function based on a result of the first QP optimization, wherein second QP optimization includes maximizing a sum of distances from the ADV to a boundary of each obstacle, m, in a set of two or more obstacles over each point of a plurality of points in time of the first trajectory, and wherein the target function includes a penalty for deviation based on the second QP optimization on the target function; and generating a second trajectory based on results of the first and the second QP optimizations; and controlling the ADV autonomously according to the second trajectory.

16. The system of claim 15, wherein the operations further comprise applying a hybrid A-star (A*) search algorithm to the open space model to generate the first trajectory.

17. The system of claim 15, wherein the first set of variables includes dual variables that represent distances between polygon sets of obstacles and the ADV, over the plurality of points, the plurality of points in time including points k=0 . . . K, and the dual variables are used to calculate a distance between each obstacle of the two or more obstacles and the ADV for the second QP optimization.

18. The system of claim 15, wherein the second QP optimization further includes minimizing a sum of a difference at each point of the plurality of points, the plurality of points in time including points k=0, K between a location and a heading, x(k), of the ADV at time k, of the first trajectory and a determined final location and heading, XF, of the ADV at the end of the first trajectory.

19. The system of claim 15, wherein the target function includes a quadratic cost function for the first and the second QP optimizations.

20. The system of claim 15, wherein the open space model is to generate a trajectory for the ADV without following a reference line or traffic lines, and wherein the obstacles are modeled as polygons.

21. The system of claim 15, wherein the open space model includes a vehicle dynamic model for the ADV.

* * * * *